(12) United States Patent
Muthiah et al.

(10) Patent No.: US 9,525,586 B2
(45) Date of Patent: Dec. 20, 2016

(54) QOS BASED BINARY TRANSLATION AND APPLICATION STREAMING

(71) Applicant: Intel Corporation, Santa Clara, CA (US)

(72) Inventors: Bharath Muthiah, Santa Clara, CA (US); William Bill Rash, Saratoga, CA (US); Glenn Hinton, Portland, OR (US); Martin G. Dixon, Portland, OR (US); Scott Hayn, Portland, OR (US); David Papworth, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 641 days.

(21) Appl. No.: 13/844,086

(22) Filed: Mar. 15, 2013

(65) Prior Publication Data

US 2014/0281008 A1  Sep. 18, 2014

(51) Int. Cl.
*H04L 29/06* (2006.01)

(52) U.S. Cl.
CPC ....... *H04L 29/0651* (2013.01); *H04L 65/4084* (2013.01); *H04L 65/80* (2013.01)

(58) Field of Classification Search
CPC .............. G06F 9/30036; G06F 9/30145; G06F 9/30018; G06F 9/30; G06F 9/30109; G06F 9/30112; G06F 9/06; G06F 9/30032; G06F 12/1027; G06F 9/3001; G06F 9/30043; G06F 9/30185; G06F 9/30192; G06F 9/3836; G06F 9/3887; G06F 12/0875; G06F 9/30021; G06F 9/3004; G06F 9/3013; G06F 9/30196; G06F 12/0862; G06F 13/24; G06F 1/3203; G06F 1/3206; G06F 1/324; G06F 1/3293; G06F 1/3296; G06F 21/602; G06F 2212/452; G06F 2212/6028; G06F 9/30029; G06F 9/30098; G06F 9/45558; G06F 11/3442; G06F 11/3068; G06F 2009/45595; G06F 9/45533; H04L 65/80; H04L 47/805; H04L 67/322; H04L 41/5006; H04L 29/0651; H04L 47/24; H04L 49/205; H04W 88/06; H04W 64/00; H04W 48/18; H04W 28/24; H04W 24/08; H04W 28/18; H04W 36/24; H04W 4/02; H04W 4/028; H04W 4/22; H04W 12/08; H04W 36/14; H04W 36/32; H04W 4/021; H04W 4/18; H04W 60/005; H04W 76/02; H04W 76/022; H04W 84/047; H04W 84/12; H04W 28/065; H04W 28/08; H04W 36/30; H04W 40/36; H04W 4/023; H04W 72/085; H04W 76/002; H04W 92/04; H04W 92/20; H04W 24/02; H04W 4/08; H04W 64/006; H04W 72/02; H04W 72/04; H04W 76/023; H04W 76/04; H04W 76/045; H04W 8/02; H04W 8/18; H04W 8/245; H04W 12/06; H04W 12/12; H04W 16/14; H04W 16/24; H04W 24/00; H04W 24/04; H04W 28/0205; H04W 28/0215; H04W 28/0226; H04W 28/0268; H04W 28/20; H04W 28/22; H04W 36/0061; H04W 36/0088; H04W 36/0094; H04W 36/08; H04W 36/18; H04W 36/22; H04W 36/38; H04W 36/385; H04W 40/026; H04W 40/125; H04W 48/04; H04W 48/06; H04W 48/12; H04W 4/025; H04W 4/12; H04W 4/20; H04W 56/001; H04W 72/00; H04W 72/0406; H04W 72/0453; H04W 72/046; H04W 72/048; H04W 72/087; H04W 72/10; H04W 72/1236; H04W 72/1252; H04W 74/004; H04W 74/06; H04W 74/0816; H04W 74/0875; H04W 76/007; H04W 76/028; H04W 76/06

(Continued)

(56) References Cited

U.S. PATENT DOCUMENTS

| | | | |
|---|---|---|---|
| 6,091,897 | A | 7/2000 | Yates et al. |
| 7,275,246 | B1* | 9/2007 | Yates et al. ............... 718/100 |

(Continued)

FOREIGN PATENT DOCUMENTS

| | | |
|---|---|---|
| WO | 98/59292 | 12/1998 |
| WO | 2012/050718 A2 | 4/2012 |

OTHER PUBLICATIONS

Notice of Preliminary from related KR patent Application 10-2014-0030194 dated Mar. 27, 2015, 16 pages.

(Continued)

*Primary Examiner* — Oleg Survillo

*Assistant Examiner* — Linh T Nguyen

(74) *Attorney, Agent, or Firm* — Nicholson De Vos Webster & Elliott LLP

(57) ABSTRACT

In one embodiment, Quality of Service (QoS) criteria based server side binary translation and execution of applications is performed on multiple servers utilizing distributed translation and execution in either a virtualized or native execution environment. The translated applications are executed to generate output display data, the output display data is encoded in a media format suitable for video streaming, and the video stream is delivered over a network to a client device. In one embodiment, one or more graphics processors assist the central processors of the servers by accelerating the rendering of the application output, and a media encoder encodes the application output into a media format.

13 Claims, 11 Drawing Sheets

(58) Field of Classification Search

USPC ............ 709/231, 203, 219, 230; 455/452.2

See application file for complete search history.

(56) References Cited

U.S. PATENT DOCUMENTS

| | | | |
|---|---|---|---|
| 8,327,354 | B1 | 12/2012 | Magenheimer et al. |
| 8,390,636 | B1* | 3/2013 | Agopian ................. 345/545 |
| 2002/0071449 | A1* | 6/2002 | Ho ..................... H04L 12/403 |
| | | | 370/447 |
| 2002/0184618 | A1* | 12/2002 | Bala et al. ................ 717/148 |
| 2004/0041813 | A1* | 3/2004 | Kim ..................... G09G 5/363 |
| | | | 345/519 |
| 2004/0172631 | A1* | 9/2004 | Howard ................... 718/100 |
| 2004/0192401 | A1* | 9/2004 | Kaida ............... H04M 1/72522 |
| | | | 455/566 |
| 2007/0077995 | A1* | 4/2007 | Oak et al. .................. 463/42 |
| 2008/0091923 | A1* | 4/2008 | Fulton et al. ............. 712/211 |
| 2008/0098446 | A1* | 4/2008 | Seckin et al. ............. 725/114 |
| 2008/0172657 | A1* | 7/2008 | Bensal ..................... G06F 8/52 |
| | | | 717/136 |
| 2008/0243998 | A1 | 10/2008 | Oh et al. |
| 2011/0107314 | A1* | 5/2011 | Babayan ................ G06F 8/53 |
| | | | 717/132 |
| 2011/0179136 | A1* | 7/2011 | Twitchell, Jr. ............ 709/217 |
| 2011/0280153 | A1* | 11/2011 | Li ........................... H04L 12/14 |
| | | | 370/254 |
| 2012/0079095 | A1* | 3/2012 | Evans ..................... G06F 8/61 |
| | | | 709/224 |
| 2012/0084774 | A1 | 4/2012 | Post et al. |
| 2012/0260067 | A1* | 10/2012 | Henry et al. ............. 712/200 |
| 2013/0117416 | A1* | 5/2013 | Sun ..................... H04L 67/2823 |
| | | | 709/219 |
| 2015/0082299 | A1* | 3/2015 | Kobayashi ............ G06F 8/61 |
| | | | 717/174 |

OTHER PUBLICATIONS

Office Action from related JP patent Application 2014-030489 dated Mar. 27, 2015, 1 page.

English translation of Office Action from related JP patent Application 2014-030489, 2 pages.

Notice of Allowance from KR patent Application 10-2014-0030194 mailed Feb. 23, 2016, 2 pages.

Notice of Allowance from JP patent Application 2014-030489 mailed Nov. 17, 2015, 1 page.

Combined Search and Examination Report from Great Britain Patent Application No. GB1404232.9, mailed Sep. 16, 2014, 5 pages.

\* cited by examiner

Priority Level Based Acceleration

QOS BASED BINARY TRANSLATION AND APPLICATION STREAMING

FIELD

Embodiments are generally related to cloud based application services, and more particularly to providing binary translation and application streaming using Quality of Service criteria.

BACKGROUND

Processors are generally designed to implement a specific instruction set architecture, and generally do not natively execute applications compiled for a different instruction set architecture. The translation of binary files compiled for one instruction set to a binary natively executable on a different instruction set has been attempted, to varying degrees of success, in the computing arts and sciences. In one instance, a binary translator translates a binary at runtime from one instruction set architecture to a different instruction set architecture. In one instance, a processor having one instruction set architecture executes emulation software, which allows the processor to execute binaries having a different instruction set architecture. Binary translation, in either instance imposes a performance penalty during application execution.

Additionally, the streaming of non-interactive media content is known in the computing arts and sciences, and it is known that streaming video can be delivered to various computing devices. Using distributed processing and storage, content can be stored in a cloud-based network and streamed on demand to multiple devices attached to the network. Streaming interactive content, such as the real time streaming of applications, however, is problematic due to round trip network latencies.

BRIEF DESCRIPTION OF THE DRAWINGS

The following description includes discussion of figures having illustrations given by way of example of implementations of the various embodiments. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein, each describe various embodiments and implementation, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments is provided below, followed by a more detailed description with reference to the drawings.

DETAILED DESCRIPTION

The combination of real time application streaming of application binaries compiled to a non-native instruction set architecture with real time application streaming is difficult to implement due to the network latencies and execution overhead. As described herein, Quality of Service (QoS) criteria based server side binary translation execution of applications is performed on multiple servers utilizing distributed translation and execution in either a virtualized or native execution environment. The translated applications are executed to generate output display data, the output display data is encoded in a media format suitable for video streaming, and the video stream is delivered over a network to a client device.

In one embodiment, one or more graphics processors assist the central processors of the servers by accelerating the rendering of the application output. An embodiment uses QoS criteria to determine which applications, or application types utilize accelerated graphics rendering. In one embodiment, a media encoder, such as a fixed function media encoder of a graphics processor accelerates the encoding of the application output frames. In on embodiment, one or more central processors of one or more servers perform distributed computation for the binary translation, and one or more graphics processors on the server provide supplementary processing functionality when computational resources are restricted.

Figure 1:
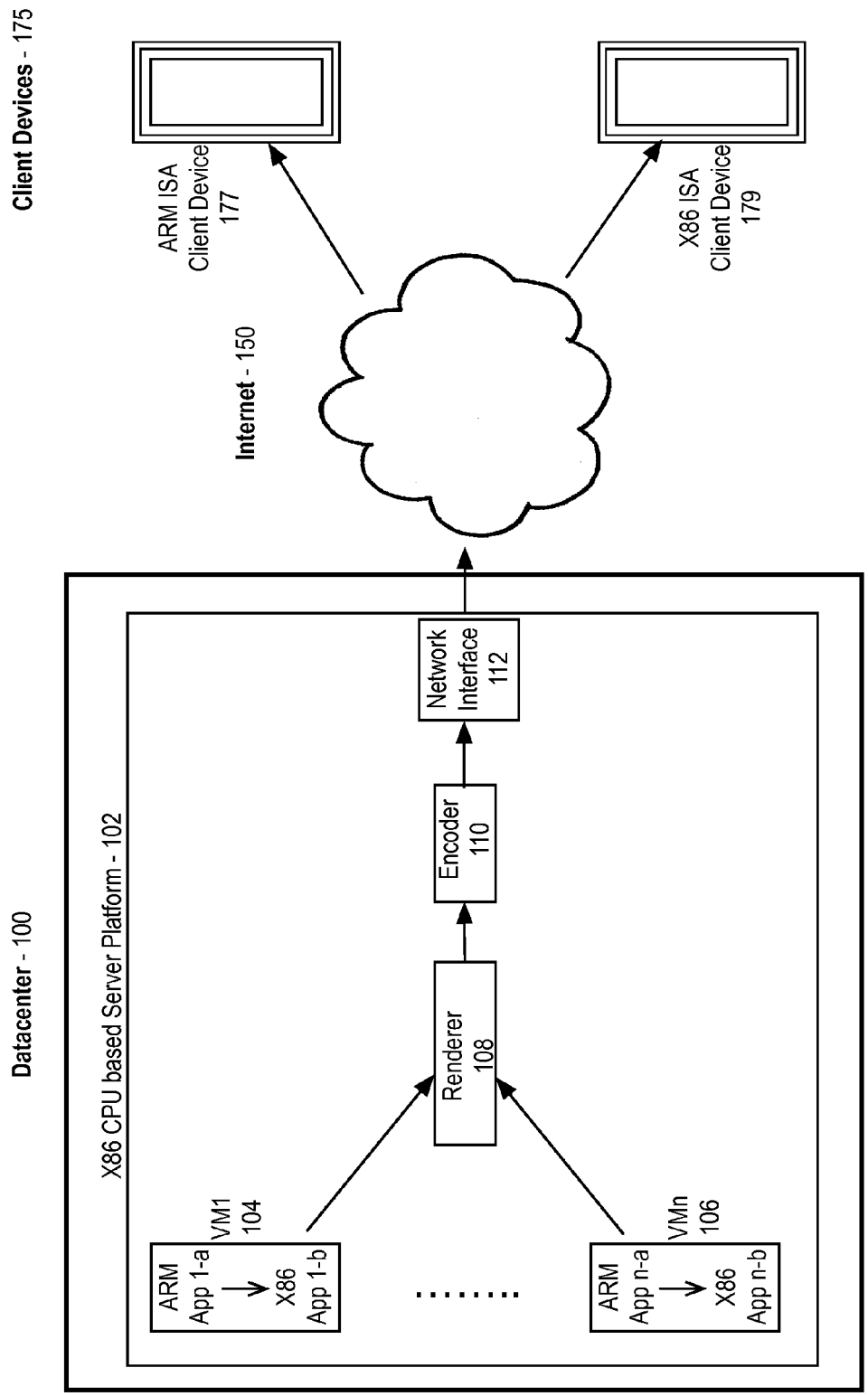
FIG. 1 is a block diagram of an embodiment of a system for providing cloud based service delivery of binary translated applications using servers housed in a datacenter.

FIG. 1 is a block diagram of an embodiment of a system for providing cloud based service delivery of binary translated applications using servers housed in a datacenter. While in FIG. 1, the delivery of ARM ISA applications using X86 based servers is illustrated, embodiments are not so limited, as the various embodiments can be utilized for any binary translation or emulation environment providing application services in a distributed computing environment. In one embodiment, a datacenter 100 provides distributed (e.g., cloud based) delivery of ARM ISA applications to client device end-points 175, such as smartphones, tablets, laptops, personal computers, and intelligent devices. Client end-point applications are at least partially executed in a distributed computing environment and the application output is streamed to a client end-point. The quality of the user experience is maintained by the use of QoS criteria to allow application streaming to minimize perceived latency and meet an agreed upon level of service to the client devices. Extensive distributed computing resources can work in parallel to perform binary translation and execution, and deliver application output to clients with limited computing resources.

As shown in FIG. 1, an embodiment houses multiple X86 central processing unit (CPU) based server platforms 102 in a datacenter 100. An ARM ISA application binary App 1-a is translated to an X86 application binary App 1-b in a virtual machine (VM) environment. Multiple VMs run on each server (e.g., VM1 104 to VMn 105), to translate ARM ISA application binaries to X86 application binaries. An embodiment executes the translated application binaries using the X86 server, and for each frame of application output, a renderer 108 generates an output frame. An embodiment utilizes a media encoder, to encode the output frame before transmitting the encoded output frame via a network interface 112 over an interconnected network, such as the Internet 150. Client devices 175, such as an ARM ISA based client device, or an X86 based client device 179 can utilize these services to run application using the processing power of a distributed network. Rapid translation or emulation of the non-native binaries using QoS criteria allows the delivery of remote application streaming to client devices with latencies consistent with local execution.

To minimize latency, the application streaming system utilizes various QoS criteria, including priority based translation, which is used to schedule translation resources and provide execution time in a prioritized manner to the multiple VMs used to translate and execute the various applications. Priority-based translation enables the minimization of round trip latency, which enables remote application execution and streaming while maintaining user experience at client devices. As part of priority based translation, separate QoS hardware attributes are used for translator code, so the various processor elements of the server platform 102 recognize and prioritize the binary translation instructions during execution, allowing, for example translation or emulation to run at a higher access priority. The high access priority instructions have greater access to system resources. For example, translation code is favored in the processor cache, and instructions and memory queues for translation have high cache priority in relation to other software executing on the server.

An additional QoS consideration is the display resolution of the emulated client device. The resolution of client end points that need to be considered from a server emulating and rendering ARM applications (e.g., App 1-a, App 2-a) is another key QoS criteria. The frame buffer display size rendered by each VM is configurable based on the targeted client end-point resolution. As part of the QoS process, the various network latencies between the datacenter 100 and the client devices 175 are queried to determine round-trip transit times. Based on available execution capacity and network latencies, differing output resolutions can be delivered to the client device under differing circumstances, and differing VMs with differing frame buffer sizes can be utilized. In one embodiment, each VM is configurable to a set of frame buffer sizes from which the VM can deliver content.

An additional QoS consideration is the geographic location of the client device. The distance between the client end-point and a server affects the level of performance the server provides during the execution and encoding process to enable seamless delivery to the client device end point. One embodiment uses multiple data centers to serve multiple geographic regions, to minimize round-trip latency.

An additional QoS consideration is the type of application emulated by the server. The server 102 utilizes graphics processing resources to accelerate game applications with complex graphics. The graphics processor accelerates the rendering of each frame, so that the frame can be encoded and delivered to the client device at a sufficient rate to maintain a high level of user experience, and to meet service level agreements for streaming frame-rate. Other applications, such as office applications or games with low graphics intensity, are rendered using the computational resources of the distributed processing environment. Additionally, applications such as computer aided design (CAD) applications also utilize graphics processor acceleration when rendering geometrically complex designs.

An additional QoS consideration is the set of media decode capabilities of the client device. The ability of one of the various client devices 175 (e.g., ARM ISA client device 177, and X86 ISA client device 179) to decode an encoded stream determines the server-side algorithm used to encode the emulated ARM application output on the server 102. For example, if the client device 175 is capable of utilizing media decoder hardware for accelerated media decode for certain media types (e.g., H.264) then the server 102 encodes the application output using a media type acceptable to the client device. If a client device 175 is not capable of performing accelerated media decode, then the server encodes the application output using a media format that the client device is capable of decoding using an application processor on the client device 175.

Figure 2:
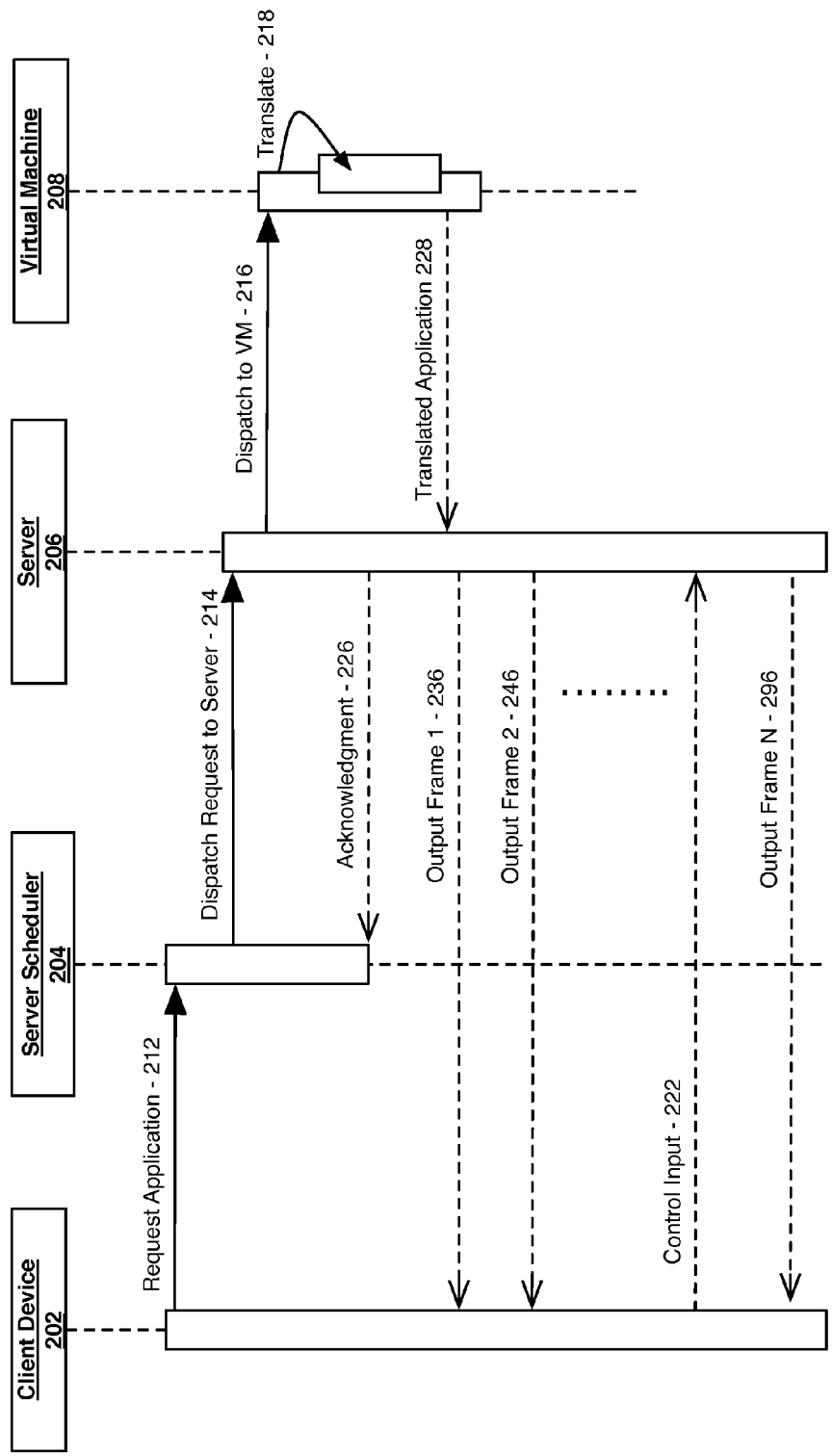
FIG. 2 is a sequence diagram of an embodiment of cloud-based delivery system for ARM ISA applications using X86 based servers.

FIG. 2 is a sequence diagram of an embodiment of cloud-based delivery system for ARM ISA applications using X86 based servers. In one embodiment, a client device 202, such as the client devices 175 of FIG. 1, sends a request 212 to a cloud based application service to run an application. The client device can provide the application to the server, or the application can be stored in a distributed storage environment coupled with the distributed execution environment of the application service. The request arrives at a server scheduler 204, and a service level agreement (SLA) deadline is determined for processing the request after the server scheduler 204 reviews the QoS criteria associated with the client device 202. The server scheduler 204 selects a server 206 with available execution resources, and dispatches 214 a request to the server 206. The sever 206 of FIG. 2 is an embodiment of the X86 CPU based server platform 102 of FIG. 1. In one embodiment, the servers report available execution time to the server scheduler in terms of emulated execution time, rather than native instruction set execution time, to allow the server scheduler 204 to schedule jobs from an ARM ISA application perspective.

Once the server 206 receives the request 214 from the server scheduler, the server sends an acknowledgement 226 to the server scheduler 204, to indicate that the request is accepted and will be executed within the SLA timeframe. If the server 206 is not capable of servicing the request before the SLA deadline, the server scheduler can re-assign the request, or can provision additional computation resources for the server. The server 206 performs binary translation for the various applications and client devices (e.g., client device 202) using virtual machine environments, such as virtual machine 208, which is an embodiment of one of the multiple VMs of FIG. 1 (e.g., VM1 104, through VMn 106). The various VMs can be configured based on the characteristics of the multiple client devices, and execution resources are distributed amongst the VMs to meet execution deadlines. An embodiment of the server 206 reviews a list of virtual machines available and dispatches 216 the application request to the virtual machine 208.

Once a request 214 to the server 206 is dispatched 216 to the virtual machine 208, a translation operation 218 is performed on the application, and a translated application 228 is produced in memory on the server. In one embodiment, the translated application is executed natively on the server 206, using the multiple processors available to the server 206, either housed within the server 206, or available on other servers within the datacenter 100. In one embodiment, one or more processors on the server execute instruction set emulation software, which presents an ISA emulation environment to the application binaries. In one embodiment, both binary translation and instruction set emulation are available, and an embodiment can deploy virtual machines capable of either method. Tasks or applications known to perform well utilizing dynamic binary translation are assigned to virtual machines capable of binary translation. Tasks or applications known to perform well in an emulation environment are assigned to virtual machines utilizing instruction set emulation for binaries that are not native to the server. In one embodiment, a substitution list for acceptable X86 ISA work-alike programs that provide the same functionality as the requested ARM ISA applications. For example, utilities or libraries with binaries available in the native instruction set of the server or virtual machine are substituted transparently.

For each output frame of the application to display, the output frame is rendered and encoded on the server 206, either natively or within a virtual machine, and the output frame is encoded based on the decode capabilities of the client device 202. For example, a first output frame 236 is transmitted to the client device, which is decoded and displayed on the display of the client device. The server 206 then transmits a second output frame 246, and displayed in sequence with the first output frame 236 when the client device 202 updates its display. The server 206 provides output frames to the client 202 at a rate sufficient to provide a smooth application experience by the utilization of the QoS criteria, which enables computing resources to shift amongst applications and virtual machines, and enables the rendering, encoding, and delivery of each application frame in a timely manner. Control input 222 is delivered from the client device to the server as indicated by the user, and the control input 222 is delivered to the application executing on the server, which responds to the control input 222, when output frame N 296 is delivered to the client device.

Figure 3:
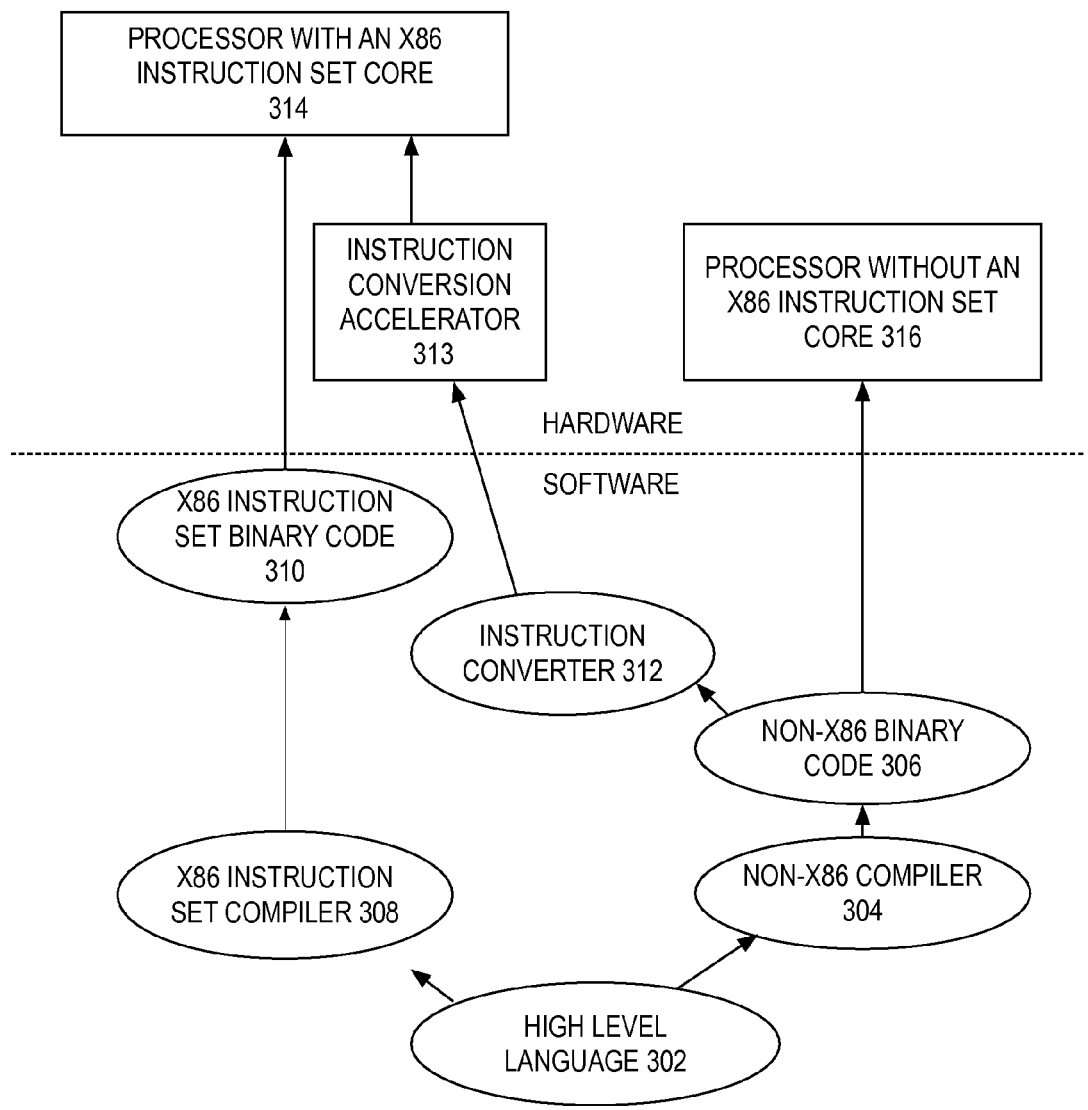
FIG. 3 is a block diagram illustrating binary translation from a source instruction set to a target instruction set according to an embodiment.

FIG. 3 is a block diagram illustrating binary translation from a source instruction set to a target instruction set according to an embodiment. An embodiment implements the binary conversion using a combination of software, firmware, and hardware, and utilizes translation and conversion specific processor instructions to accelerate specific aspects of the conversion and translation. While non-X86 to X86 translation and emulation is illustrated, embodiments are not so limited. For natively executed instructions, a program in a high level language 302 is compiled using an x86 compiler 304 to generate x86 binary code 306 that may be natively executed by a processor with at least one processor core 314 capable of executing the X86 instruction set. The processor with at least one x86 instruction set core 314 represents any processor that can perform substantially the same functions as an Intel processor with at least one X86 instruction set core. The processor 314 compatibly executes or otherwise processes a substantial portion of the instruction set of the Intel X86 instruction set core or object code versions of applications or other software targeted to run on an Intel processor.

The X86 compiler 308 represents a compiler that is operable to generate x86 binary code 310 (e.g., object code) that can, with or without additional linkage processing, be executed on the processor with at least one x86 instruction set core 314. Similarly, when the program in the high level language 302 is compiled using an alternative instruction set compiler 304 to generate alternative instruction set binary code 306, that binary is natively executable by a processor using the alternative instruction set 316. For example, a processor with a non-X86 core includes a processor that executes the MIPS instruction set of MIPS Technologies of Sunnyvale, Calif. or that executes the ARM instruction set of ARM Holdings of Sunnyvale, Calif. The instruction converter 312 converts the non-X86 binary code 306 into code that natively executable by the processor an X86 instruction set core 314.

An embodiment utilizes hardware 313 for instruction conversion acceleration in conjunction with the instruction converter 312. The instruction conversion accelerator 313 includes server chipset and processor based acceleration for virtualization and translation tasks. For example, X86 ISA extensions and enhancements are included to accelerate ARM ISA translation on an embodiment of an X86 processor, including 32-bit and 64-bit execution modes. X86 instruction set extensions include instructions to handle ARM ISA specific conditionals, including conditionals of the ARM v8 instruction set.

Additional instruction set extensions provide for alternate variants of X86 instructions that more readily execute instructions translated from a non-native instruction set. For example, additional X86 instructions are available to indicate that an ARM ISA instruction to be translated is performing a memory reference, an integer operation on an arithmetic logic unit (ALU), or a floating-point operation on a floating-point unit (FPU). Through a combination of software, firmware, and hardware, the instruction converter 312, and the instruction conversion accelerator 313 allow the processor, or other electronic device having an X86 instruction set processor or core 314 to execute non-X86 binary code 306.

Figure 4:
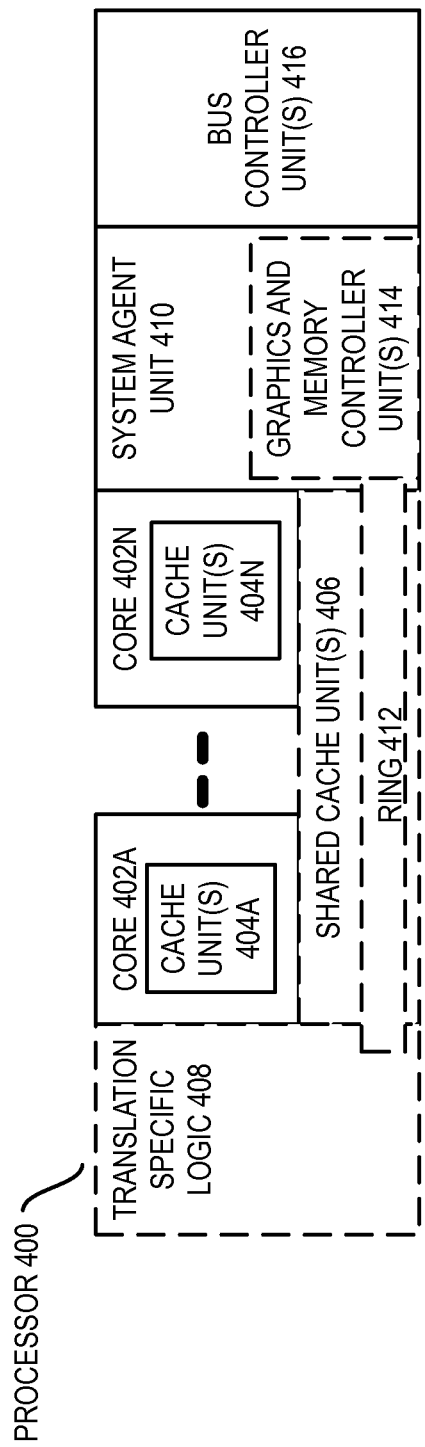
FIG. 4 is a block diagram of a processor with multiple cores, an integrated graphics and memory controller, and translation specific logic according to an embodiment.

FIG. 4 is a block diagram of a processor 400 with multiple cores, an integrated graphics and memory controller, and translation specific logic according to an embodiment. Processor 400 has multiple cores, from a first core 402A, up to N number of cores 402N. Also present is a system agent 410, a set of one or more bus controller units 416, and a set of one or more integrated graphics and memory controller unit(s) 414 in the system agent unit 410. Additionally, special purpose translation specific logic 408 is present to accelerate binary translation or emulation from a non-X86 instruction set.

Various embodiments of the processor 400 are configured as general-purpose processor cores suitable for use in a server designed to provide real time binary translation, execution and streaming to client devices, while utilizing QoS criteria to enable streaming application delivery within an agreed upon service and quality level. The graphics and memory controller unit(s) 414 include one or more graphics engines that accelerate rendering for graphically intensive operations, as determined by the QoS criteria. If the graphics engine on a server is underutilized, the graphics engine provides GPGPU (general purpose graphics processing unit) capability, to provide supplemental execution resources to an application or virtual machine executing instructions on the processor 400. In one embodiment, the processor 400 is, or utilizes a high-throughput many integrated core (MIC) coprocessor (including 30 or more cores) to provide a large amount of computational resources to the virtual machines executing on the server. One or more components of the processor 400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 406, and external memory (not shown) coupled to the set of integrated graphics and memory controller units 414. The set of shared cache units 406 includes one or more mid-level caches (e.g., a level 2 (L2), and a level 3 (L3) cache). In one embodiment a ring based interconnect unit 412 interconnects the translation logic 408, the set of shared cache units 406, and the system agent unit 410, including the integrated graphics and memory controller unit(s) 414. In one embodiment, coherency is maintained between one or more cache units 406 and cores 402-A-N.

In some embodiments, one or more of the cores 402A-N are capable of multi-threading. The system agent 410 includes those components coordinating and operating cores 402A-N. The system agent unit 410 may include for example a power control unit (PCU) and a display unit. The PCU may be or include logic and components needed for regulating the power state of the cores 402A-N and the integrated graphics logic 408. The display unit is for driving one or more externally connected displays.

The cores 402A-N may be homogenous or heterogeneous in terms of architecture instruction set; that is, two or more of the cores 402A-N may be capable of execution the same instruction set, while others may be capable of executing only a subset of that instruction set or a different instruction set. In one embodiment, one or more cores 402A-N execute a standard X86 instruction set, while one or more additional cores execute an extended X86 instruction set, which makes use of the translation specific logic 408.

Figure 5:
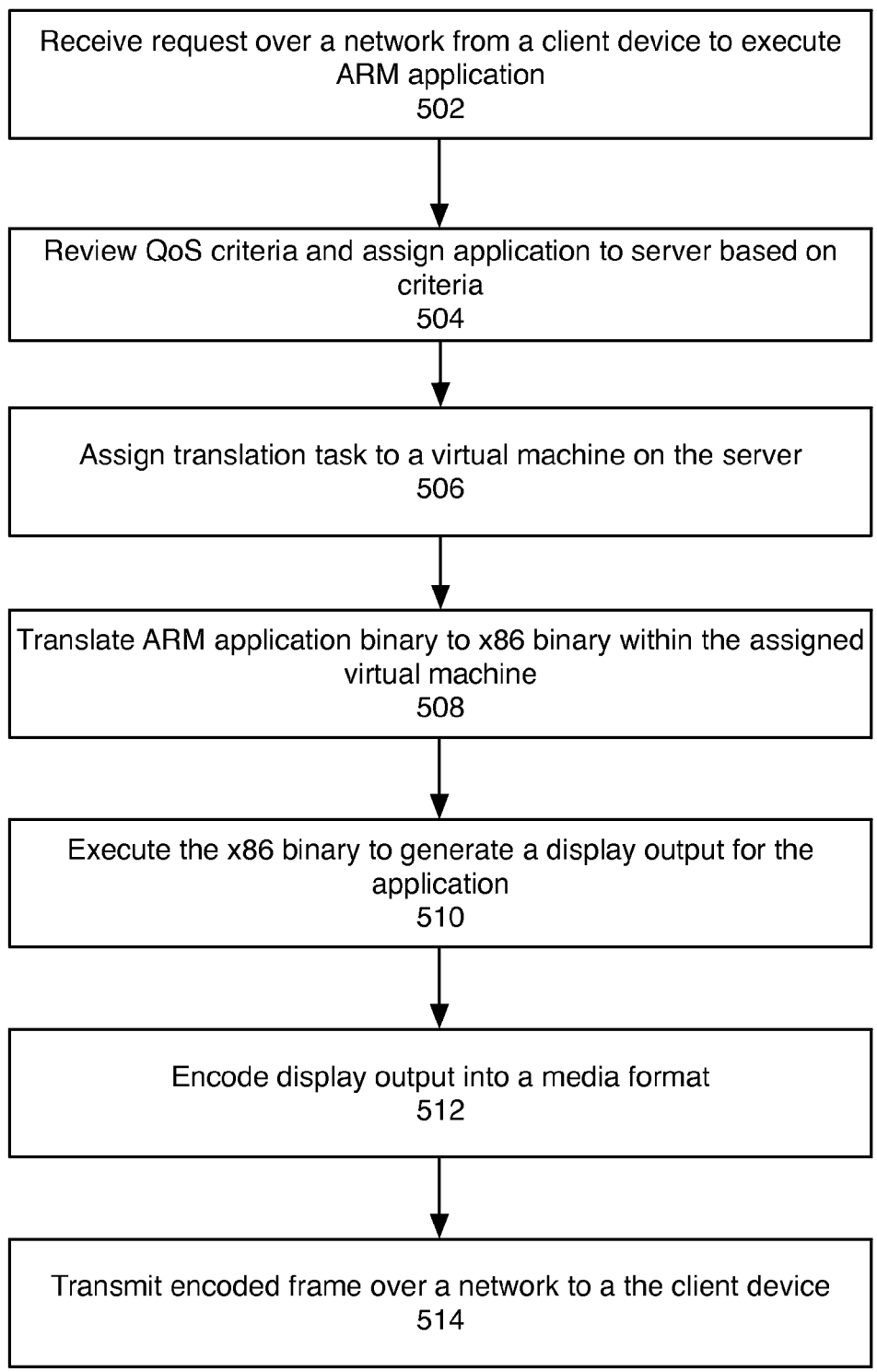
FIG. 5 is an overview of an embodiment of a method of QoS based binary translation and execution streaming on an X86 CPU based server.

FIG. 5 is an overview of an embodiment of a method of QoS based binary translation and execution streaming on an X86 CPU based server. In one embodiment, a cloud-based application streaming service receives a request over a network to execute an ARM ISA application, as shown at block 502. At block 504, a server scheduler reviews the QoS criteria and assigns the application to a server based on the criteria. For example, the server scheduler can assess a request priority based on computational and graphics intensity, and assign the request to a server with sufficient execution capacity. An embodiment of the server scheduler assigns an successive requests for the same application to the same server, if possible, such that the server can retrieve the translated application from an application cache or previously translated applications, allowing the server to avoid repeated translations of the same application binary. An embodiment also maintains a substitution list for acceptable X86 ISA work-alike programs that provide the same functionality as the requested ARM ISA applications. When an acceptable X86 ISA work-alike program is available, either natively or via a previously executed translation, the server transparently substitutes the X86 work-alike program for the ARM ISA program.

At block 506, the server reviews the set of virtual servers executing in the set of virtual machines on the server and assigns a translation task to an available virtual machine that correlates with the QoS criteria of the task, such as a VM with an appropriate frame buffer size, or a VM with an appropriate amount of graphics controller execution resources available. At block 508, an ARM ISA application binary is translated within the assigned virtual machine. The processors offer instructions specific to ARM ISA translation, which the translation software and virtual machines can utilize. An embodiment can execute the translation instructions at a higher priority than other code, giving translation instructions and data higher cache priority that other tasks executing on the various processors used to execute the translation software.

As shown at block 510, the translated application is executed on the server, to generate a display output for the application. Any input data or control input provided by the user at the client device is delivered to the executing application on the server, allowing a user at the client device to control the executing application as though the application is executing on the client device. Each frame of output is rendered by the server, and at block 512, the output is encoded in a media format, which is transmitted over a network to the client device, as shown at block 514. The executing, encoding and transmitting is governed by QoS criteria, such as the display resolution of the client device, the round trip latency over the network between the server and the client device, and the application type that is remotely executed. In one embodiment, the server uses graphics processor acceleration for graphically intensive operations. The one or more graphics processors on the server can be time sliced, allowing each virtual machine executing on a server a specific amount of graphics processor execution time based on execution priority. In one embodiment, the server uses graphics processors with general purpose compute capability, allowing the graphics processor to provide supplementary compute resources to assist the various processors of the server, and the various distributed processors coupled with the sever.

Figure 6:
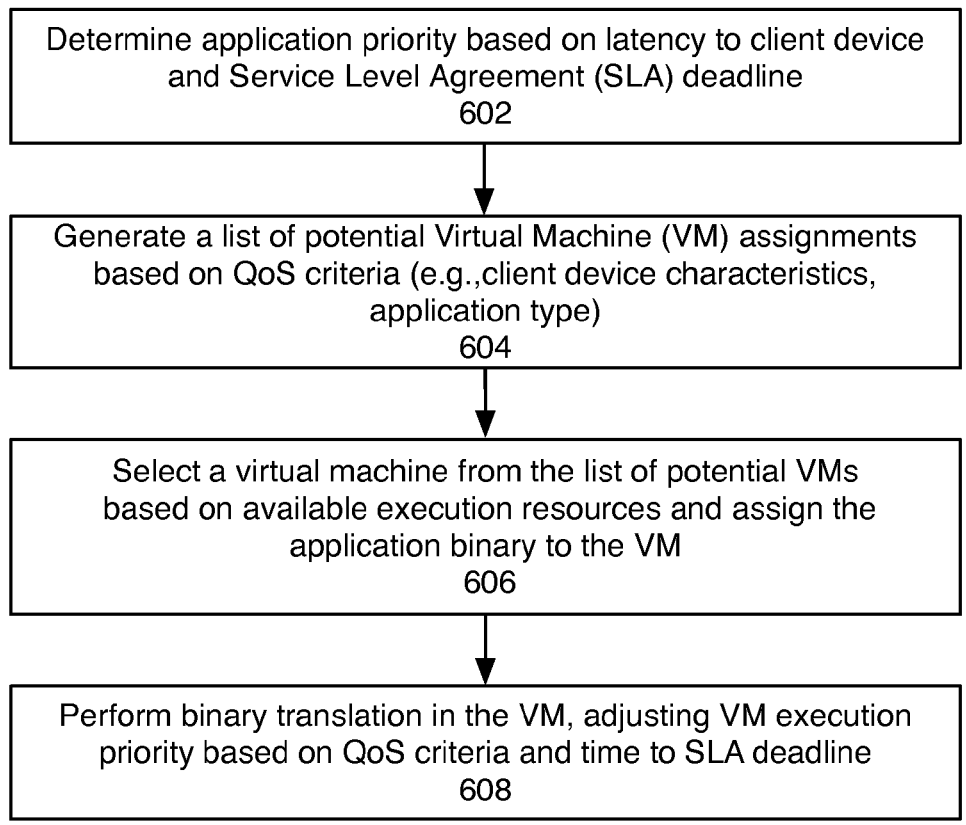
FIG. 6 is a flow diagram of an embodiment of a server side process of utilizing priority level based acceleration for ARM ISA binary translation.

FIG. 6 is a flow diagram of an embodiment of a server side process of utilizing priority level based acceleration for ARM ISA binary translation. As shown in block 602, an embodiment determines the application priority based on the latency between the server and the client device, and the service level agreement (SLA) deadline for the application. To maintain quality service, an agreed upon level of service is provided by the server for remote application execution. The client device anticipates a response to a remote execution request within an agreed upon period, and the time remaining until the deadline informs upon the execution priority of the translation. For example, if a scheduling delay results in a reduced window for application translation, the translation task is given a high priority, and the translation task is accelerated via the application of additional computation resources to the translation task.

In parallel with determining application priority, as shown in block 602, an embodiment generates a list of potential virtual machine (VM) assignments as shown in block 604. The potential assignments are based upon QoS criteria including client device characteristics and application type. The list of potential assignments includes VMs with a frame buffer configuration that is compatible with the display resolution of the client device, or VMs with sufficient graphics processor execution resources available, if the application is graphically intensive. At block 606, a virtual machine from the list of potential VMs is selected based on available execution resources, and the application binary is assigned to the VM. The VM then performs the binary translation, as shown at block 608.

A priority enforcement mechanism is used in one embodiment to enable accelerated of binary translation in the virtual machines with higher priority levels. For example, if a translation process is nearing its deadline, the server can accelerate the translation process via the addition of greater execution resources to the translation VMs. Register bits, hardware timers, and control logic integrated into the server hardware is utilized to manage VM execution, and to provide greater execution resources to VMs performing high priority tasks.

Figure 7:
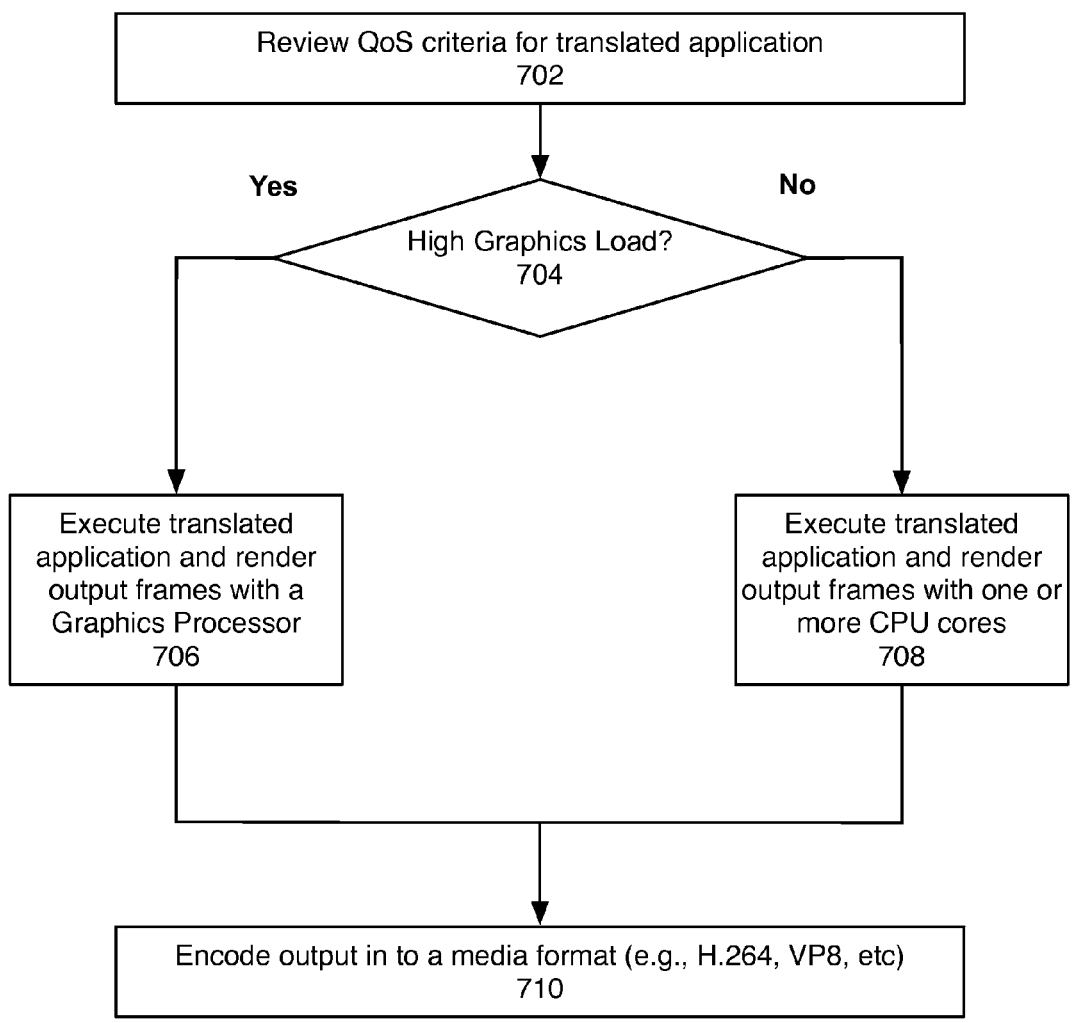
FIG. 7 is a flow diagram of a process of utilizing graphics processor acceleration, according to an embodiment.

FIG. 7 is a flow diagram of a process of utilizing graphics processor acceleration, according to an embodiment. An embodiment of QoS based binary translation and application streaming begins at block 702 by reviewing the QoS criteria for the translated application. For example, QoS criteria including device display resolution and application type are indicators of the degree of graphical complexity present in an application. If it is determined, at block 704, that the application has a high graphics load, the server executes the application and renders frame output using graphics processor acceleration, as shown at block 706. For example, a game application executing at HD resolution (e.g., 1280× 720, 1920×1080, etc.) uses a graphics processor to render the output frames of the application. If the QoS criteria indicates that the application can be executed within the SLA period using general purpose processor cores, then one or more CPU cores are used to execute and render the output frames of the application, as shown at block 708. A utility application, such as a spreadsheet, or other office applications likely execute without graphics acceleration. However, an embodiment can utilize graphics processors to accelerate rendering if, for example, network latency indicates that SLA deadlines are difficult to reach without accelerated rendering.

After rendering, the output frames are encoded into a media format, as shown at block 710. An embodiment determines the media format to use based on the set of client device media decode capabilities, including whether the client device supports hardware accelerated decode. For example, if a client device with support for hardware accelerated decode of media encoded in the H.264 format, the server can encode output frames into the H.264 format before transmitting the output frame to the client device. In one embodiment, the server utilizes specialized utilizes media encoder hardware to encode output frames before transmission to the client device. In one embodiment, the graphics processor includes media encoder hardware. In one embodiment, the processor supports instructions to accelerate media encoding.

FIGS. 8-11 are block diagrams of exemplary computer architectures. Other system designs and configurations known in the arts for laptops, desktops, handheld PCs, smartphones, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable.

Figure 8:
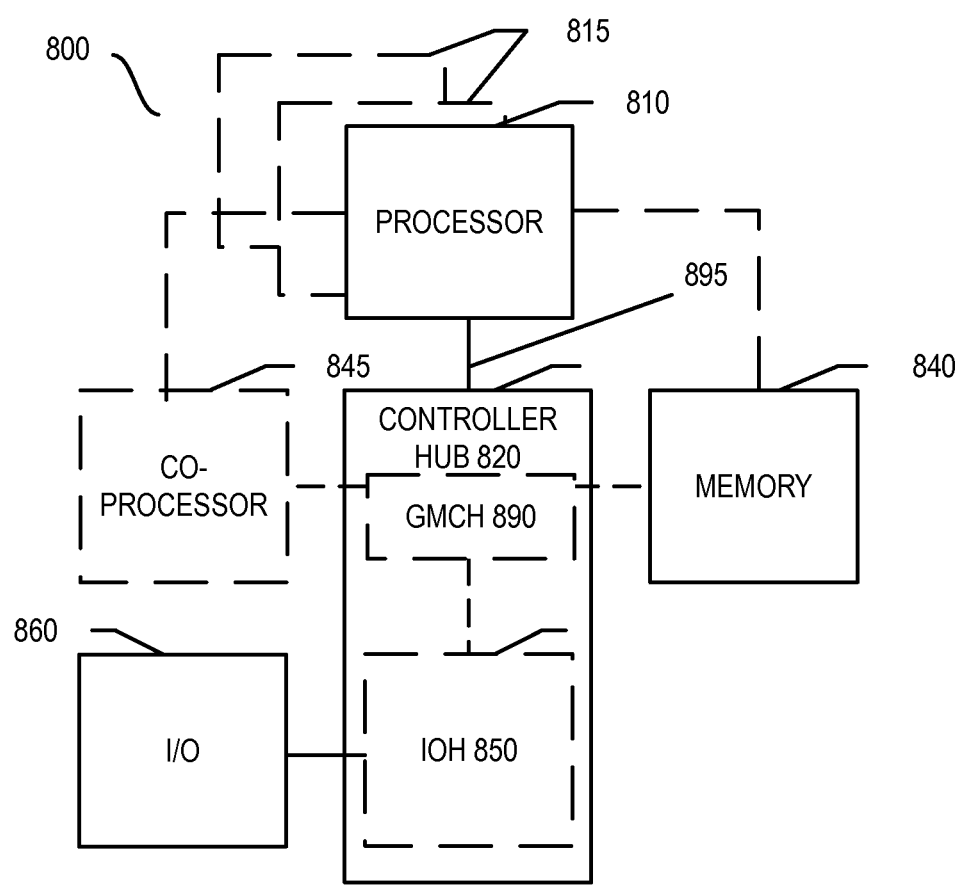
FIGS. 8-11 are block diagrams of exemplary computer architectures.

FIG. 8 illustrates a block diagram of a system 800 in accordance with an embodiment. The system 800 includes one or more processors 810, 815, which are coupled to a controller hub 820. In one embodiment, the controller hub 820 includes a graphics memory controller hub (GMCH) 890 and an Input/Output Hub (IOH) 850; the GMCH 890 includes memory and graphics controllers which are coupled with memory 840 and a coprocessor 845; the IOH 850 couples input/output (I/O) devices 860 to the GMCH 890. Alternatively, one or both of the memory and graphics controllers are integrated within the processor (as described herein), the memory 840 and the coprocessor 845 are coupled with the processor 810, and the controller hub 820 in a single chip with the IOH 850.

The optional nature of additional processors 815 is denoted in FIG. 8 with broken lines. Each processor 810, 815 includes one or more of the processing cores described herein, which each are some version of the processor 400.

In one embodiment, the memory 840 is dynamic random access memory (DRAM). In one embodiment, 840 is phase change memory (PCM), or a combination of PCM and DRAM. For at least one embodiment, the controller hub 820 communicates with the processor(s) 810, 815 via a multi-drop bus, such as a ring interface, a front side bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator. In one embodiment, memory translation or emulation acceleration hardware is present, as described herein.

There can be a variety of differences between the physical resources 810, 815 in terms of a spectrum of metrics of merit including architectural, micro-architectural, thermal, power consumption characteristics, and the like.

Figure 9:
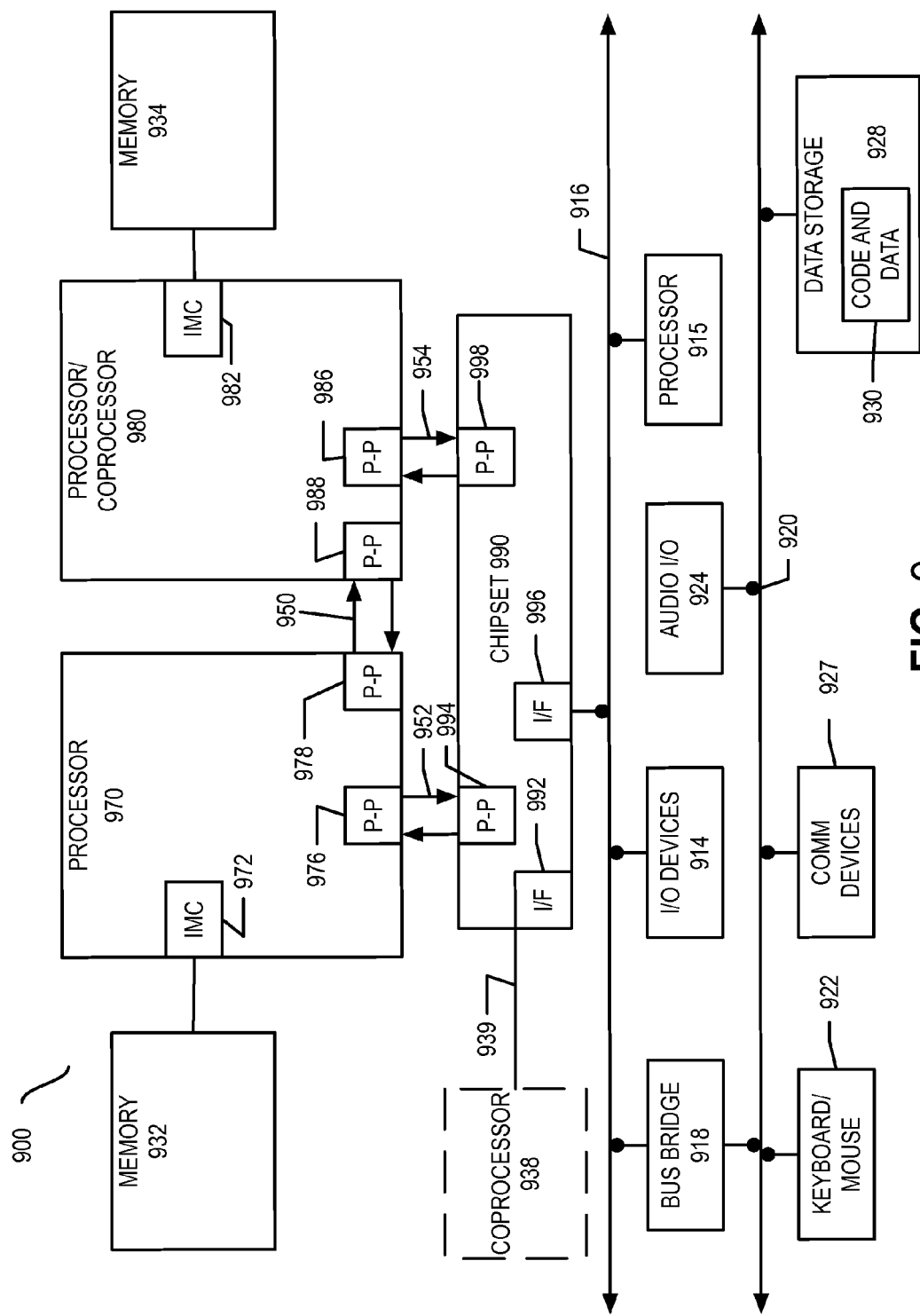

FIG. 9 is a block diagram of a more specific exemplary server system 900 in accordance with an embodiment. As shown in FIG. 9, multiprocessor system 900 is a point-to-point interconnect system, and includes a first processor 970 and a second processor 980 coupled via a point-to-point interconnect 950. Each of processors 970 and 980 are a variant of the processor 400. In one embodiment, processors 970 and 980 are respectively processors 810 and 815, while coprocessor 938 is coprocessor 845. In another embodiment, processors 970 and 980 are respectively processor 810 and coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972, and 982 couple the processors to respective memories, namely a memory 932 and a memory 934, which may be portions of main memory locally attached to the respective processors.

Processors 970, 980 each exchange information with a chipset 990 via individual P-P interfaces 952, 954 using point to point interface circuits 976, 994, 986, 998. Chipset 990 optionally exchanges information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, binary translation accelerator, or the like.

A shared cache (not shown) may be included in either processor or outside of both processors, yet connected with the processors via P-P interconnect, such that either or both processors' local cache information may be stored in the shared cache if a processor is placed into a low power mode. In one embodiment, the shared cache of 900 grants priority to translation acceleration functions, and virtualization acceleration functions, as described herein.

Chipset 990 is coupled to a first bus 916 via an interface 996. In one embodiment, first bus 916 is a Peripheral Component Interconnect (PCI) bus, or a bus such as a PCI Express bus or another third generation I/O interconnect bus, but these are non-limiting examples.

As shown in FIG. 9, various I/O devices 914 may be coupled to first bus 916, along with a bus bridge 918 that couples first bus 916 to a second bus 920. In one embodiment, one or more additional processor(s) 915, such as coprocessors, high-throughput MIC processors, GPGPU's, accelerators (e.g., graphics accelerators or digital signal processing (DSP) units), field programmable gate arrays (FPGAs), or any other processor, are coupled to first bus 916. In one embodiment, second bus 920 is a low pin count (LPC) bus. Various devices can coupled to the second bus 920 including, a keyboard and/or mouse 922, communication devices 927 and a storage unit 928 such as a disk drive or other mass storage device that may include instructions/code and data 930, in one embodiment. Further, an audio I/O 924 can couple with the second bus 920. Note that other architectures are possible. For example, instead of the point-to-point architecture of FIG. 9, a system may implement a multi-drop bus, a ring bus, or other such architecture.

Figure 10:
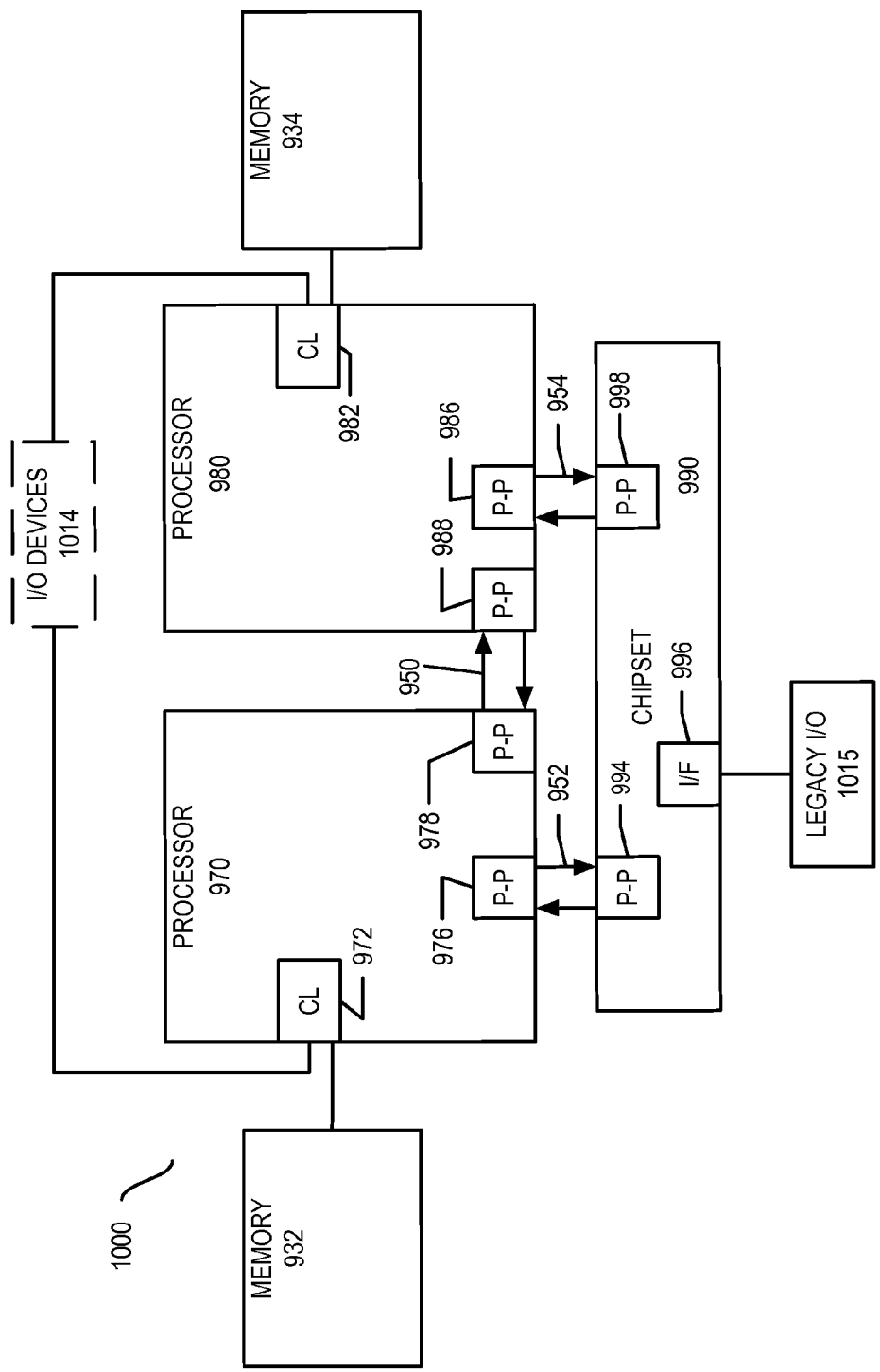

FIG. 10 is a block diagram of a second more specific exemplary system 1000 in accordance with an embodiment. Similar elements in FIGS. 9 and 10 bear like reference numerals and certain aspects of FIG. 9 have been omitted from FIG. 10 in order to avoid obscuring other aspects of FIG. 10.

FIG. 10 illustrates that, in one embodiment, processors 970, 980 include integrated memory and I/O control logic ("CL") 972 and 982, respectively. Thus, the CL 972, 982 include integrated memory controller units and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
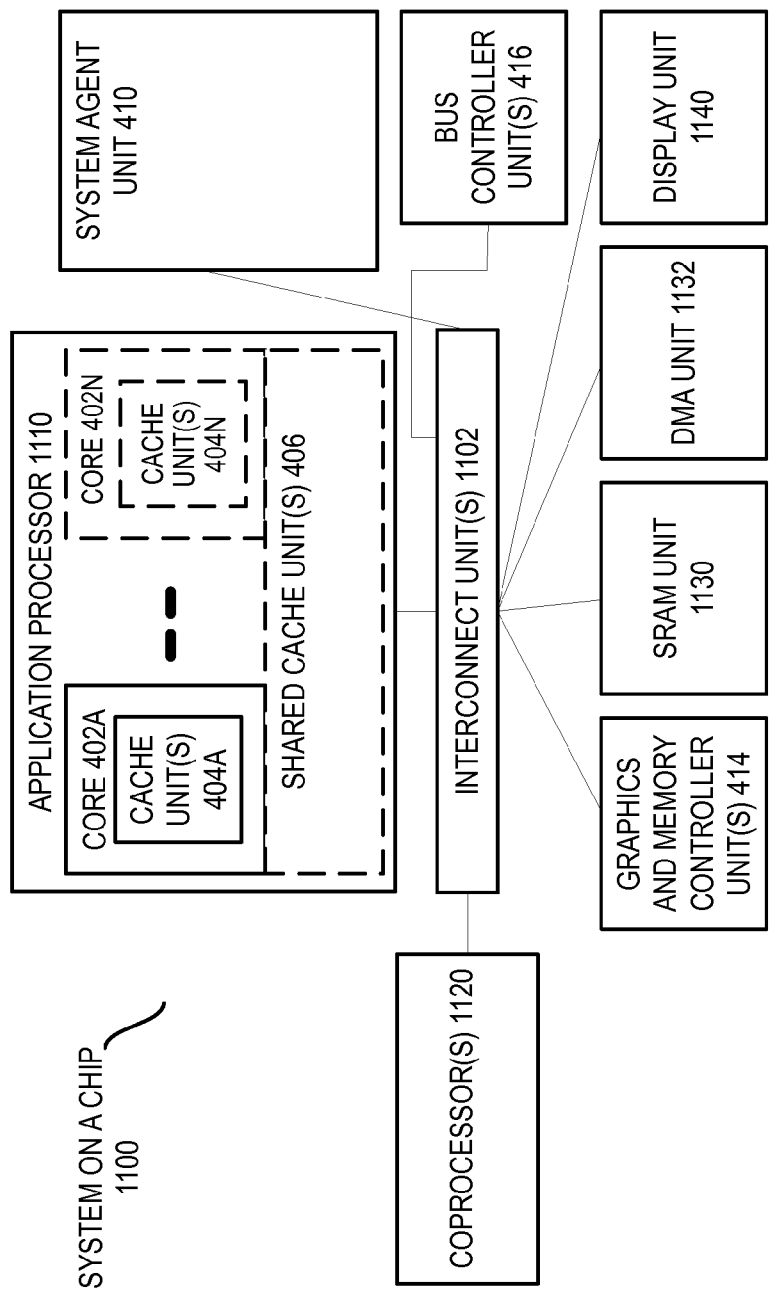

FIG. 11 is a block diagram of a SoC 1100 in accordance with an embodiment. Similar elements in FIG. 4 bear like reference numerals. Additionally, dashed lined boxes are optional features on more advanced SoCs. In one embodiment, a client device as described herein, includes a variant of SoC 1100. In FIG. 11, an interconnect unit(s) 1102 is coupled to: an application processor 1110 which includes a set of one or more cores 202A-N and shared cache unit(s) 406; a system agent unit 410; a bus controller unit(s) 416; an integrated memory controller unit(s) 414; a set or one or more coprocessors 1120 which include binary translation acceleration logic, integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like. In one embodiment, the video processor, integrated graphics logic, or GPGPU is included in one or more cores 402N Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code can be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, non-transitory machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), re-writable compact disks (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Besides what is described herein, various modifications can be made to the disclosed embodiments and implementations without departing from their scope. Therefore, the illustrations and examples herein should be construed in an illustrative, and not a restrictive sense. The scope of the embodiments should be measured solely by reference to the claims that follow.

What is claimed is:

1. A server comprising:
a non-transitory machine-readable storage medium storing instructions;
a processor, to execute the instructions, the instructions to perform operations to:
translate a binary having a second instruction set, into a translated binary having a first instruction set, the translation governed by Quality of Service (QoS) criteria, wherein the instructions to translate the binary have priority in a cache of the processor, wherein the operations to translate the binary execute within a virtual machine, and the QoS criteria include priority based acceleration and multiple client parameters, wherein the multiple client parameters include a client device resolution, a client device location, a client application type, and a set of client decode capabilities, and execute the translated binary to render an output frame;

a media encoder coupled with the processor, to encode the output frame into a media format; and a network device coupled with the media encoder and the processor, the network device to transmit the encoded output frame to a client device.

2. The server of claim 1, further comprising a scheduler, to set an execution priority of a virtual machine based on the QoS criteria.

3. The server of claim 2, further comprising a graphics accelerator coupled to the processor, to assist the processor to render the output frame.

4. The server of claim 3, wherein the graphics accelerator assists the media encoder to encode the output frame into a media format.

5. A binary translation system comprising:

a server having a central processor and a network interface, the central processor having a first instruction set, the server to translate a binary having a second instruction set into a translated executable having the first instruction set, the translation performed using Quality of Service (QoS) criteria including priority based acceleration that factors a network latency between the server and the client device to set binary translation priority, and multiple client parameters, wherein the multiple client parameters include a client device resolution, a client device location, a client application type, and a set of client decode capabilities, wherein the server executes the translated binary to generate a frame of rendered output, and transmits the frame of rendered output via the network interface, wherein the server executes the binary translation within a virtual machine, the virtual machine is tuned for the client device, and virtual machine execution resources are tuned via the QoS criteria; and a client device having a display, a client processor and a client network interface, the client device to receive the frame of rendered output from the server via the client network interface, and to display the frame of rendered output on the display using the client processor.

6. The binary translation system of claim 5, wherein the frame of rendered output is encoded into a media format before the server transmits the frame of rendered output.

7. The binary translation system of claim 6, wherein the server further includes a graphics processor, to generate the frame of rendered output.

8. The binary translation system of claim 7, wherein the graphics processor encodes the frame of rendered output into the media format.

9. The binary translation system of claim 5, wherein the client processor of the client device has the first instruction set.

10. The binary translation system of claim 5, wherein the client processor of the client device has the second instruction set.

11. The binary translation system of claim 5, wherein the first instruction set is an x86 instruction set, and the second instruction set is an ARM instruction set.

12. A non-transitory computer readable medium storing instructions for execution by a processor, the instructions, when executed, cause the processor to perform operations, the operations comprising:

translating a binary having a second instruction set into a translated binary having a first instruction set, the translating governed by Quality of Service (QoS) criteria, wherein the translating occurs within a virtual machine, the virtual machine execution resources are tuned for a client device via the QoS criteria, the QoS criteria including priority based acceleration that factors a network latency between the server and the client device to set binary translation priority, and multiple client parameters, wherein the multiple client parameters include a client device resolution, a client device location, a client application type, and a set of client decode capabilities;

executing the translated binary to render an output frame, wherein the executing is assisted by a graphics processor if graphics acceleration is indicated by the QoS criteria;

encoding the output frame into a media format, the media format selected by the set of client decode capabilities; and transmitting the output frame over a network device to a client device.

13. The non-transitory computer-readable medium of claim 12, the operations further comprising:

translating a first binary in a first virtual machine on a first server;

translating a second binary in a second virtual machine on a second server; and executing a third binary on the first server, wherein the first server previously translated the third binary, and the third binary is re-translated before the executing.

* * * * *